United States Patent
Lin et al.

(10) Patent No.: US 10,507,915 B2
(45) Date of Patent: Dec. 17, 2019

(54) METHOD FOR PROVIDING OBSTACLE AVOIDANCE USING DEPTH INFORMATION OF IMAGE AND UNMANNED AERIAL VEHICLE

(71) Applicants: INVENTEC APPLIANCES (PUDONG) CORPORATION, Shanghai (CN); INVENTEC APPLIANCES CORP., New Taipei (TW)

(72) Inventors: Cheng-Yu Lin, New Taipei (TW); Kuo-Feng Hsu, New Taipei (TW)

(73) Assignees: INVENTEC APPLIANCES (PUDONG) CORPORATION, Shanghai (CN); INVENTEC APPLIANCES CORP., New Taipei (TW)

( * ) Notice: Subject to any disclaimer, the term of this patent is extended or adjusted under 35 U.S.C. 154(b) by 202 days.

(21) Appl. No.: 15/082,013

(22) Filed: Mar. 28, 2016

(65) Prior Publication Data

US 2017/0243355 A1   Aug. 24, 2017

(30) Foreign Application Priority Data

Feb. 23, 2016   (CN) .......................... 2016 1 0097501

(51) Int. Cl.
*H04N 7/18* (2006.01)
*B64C 39/02* (2006.01)
*G05D 1/00* (2006.01)
*G05D 1/10* (2006.01)

(52) U.S. Cl.
CPC .......... *B64C 39/024* (2013.01); *G05D 1/0088* (2013.01); *G05D 1/101* (2013.01); *H04N 7/188* (2013.01); *B64C 2201/141* (2013.01)

(58) Field of Classification Search
CPC ....................................................... H04N 19/00
USPC ................................................... 348/142–160
See application file for complete search history.

(56) References Cited

U.S. PATENT DOCUMENTS

| | | | | |
|---|---|---|---|---|
| 2011/0128379 A1* | 6/2011 | Lee | ..................... | G06K 9/00805 348/144 |
| 2015/0226575 A1* | 8/2015 | Rambo | .................. | B64C 39/024 701/523 |
| 2017/0308103 A1* | 10/2017 | Li | ............................ | G05D 1/10 |

* cited by examiner

*Primary Examiner* — Anand S Rao
(74) *Attorney, Agent, or Firm* — McClure, Qualey & Rodack, LLP

(57) ABSTRACT

Method for providing obstacle avoidance using depth information of image is provided. The method includes the following steps. Shoot a scene to obtain a depth image of the scene. Determine a flight direction and a flight distance according to the depth image. Then, fly according to the flight direction and the flight distance.

20 Claims, 4 Drawing Sheets

METHOD FOR PROVIDING OBSTACLE AVOIDANCE USING DEPTH INFORMATION OF IMAGE AND UNMANNED AERIAL VEHICLE

This application claims the benefit of People's Republic of China application Serial No. 201610097501.5, filed Feb. 23, 2016, the subject matter of which is incorporated herein by reference.

TECHNICAL FIELD

The disclosure relates in general to an obstacle avoiding method and an unmanned aerial vehicle (UAV), and more particularly to a method for providing obstacle avoidance using depth information of image and an unmanned aerial vehicle using the same.

BACKGROUND

The operation mode of an unmanned aerial vehicle (UAV) mainly includes a manual flight mode and an automatic flight mode. In the automatic flight mode, an obstacle avoiding method must be provided so that the unmanned aerial vehicle can avoid obstacles and arrive at the destination safely. The obstacle avoiding method normally needs to scan the environment or provide various environmental parameters (such as geographical information) to create an environment model so as to determine a flight path with reference to the environment model to avoid the obstacles. However, it requires a large amount of time to create and maintain an environment model. Additionally, the calculation of flight path according to the environment model requires a large volume of data computation. To calculate the flight path, the unmanned aerial vehicle must be equipped with high-efficiency processor, which incurs extra cost.

SUMMARY

The disclosure is directed to a method for providing obstacle avoidance using depth information of image and an unmanned aerial vehicle capable of determining a flight direction and a flight distance to avoid obstacles according to a depth image.

According to one embodiment, a method for providing obstacle avoidance using depth information of image is provided. The method for providing obstacle avoidance using depth information of image includes following steps. Firstly, a scene is shot to obtain a depth image of the scene. Next, a flight direction and a flight distance are determined according to the depth image. Then, fly according to the flight direction and the flight distance.

According to another embodiment, an unmanned aerial vehicle is provided. The unmanned aerial vehicle includes an image capturing unit and a processing unit. The image capturing unit shoots a scene to obtain a depth image of the scene. The processing unit is coupled to the image capturing unit for determining a flight direction and a flight distance according to the depth image and controlling the unmanned aerial vehicle to fly according to the flight direction and the flight distance.

The above and other aspects of the invention will become better understood with regard to the following detailed description of the preferred but non-limiting embodiment(s). The following description is made with reference to the accompanying drawings.

DETAILED DESCRIPTION

Figure 1:
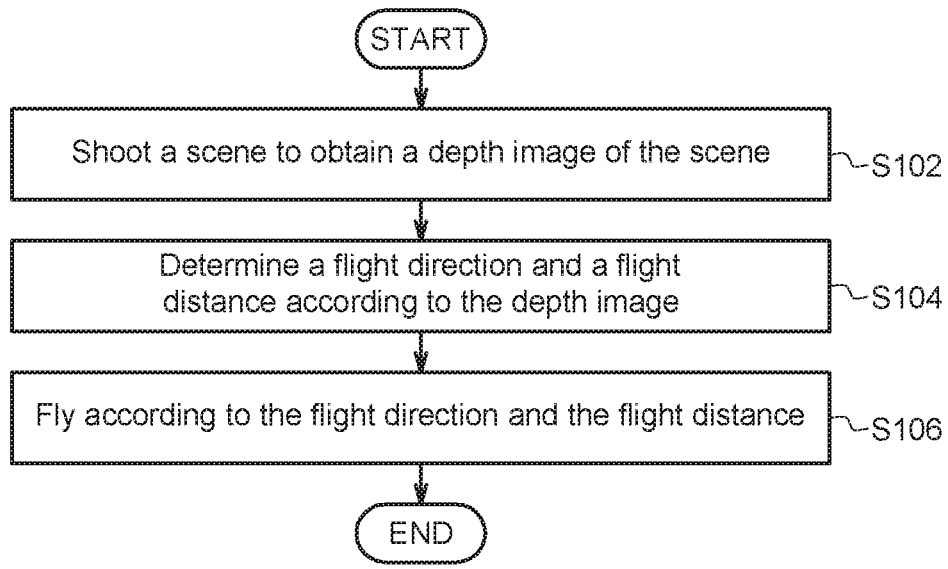
FIG. 1 shows a flowchart of a method for providing obstacle avoidance using depth information of image according to an embodiment of the invention.
Figure 2:
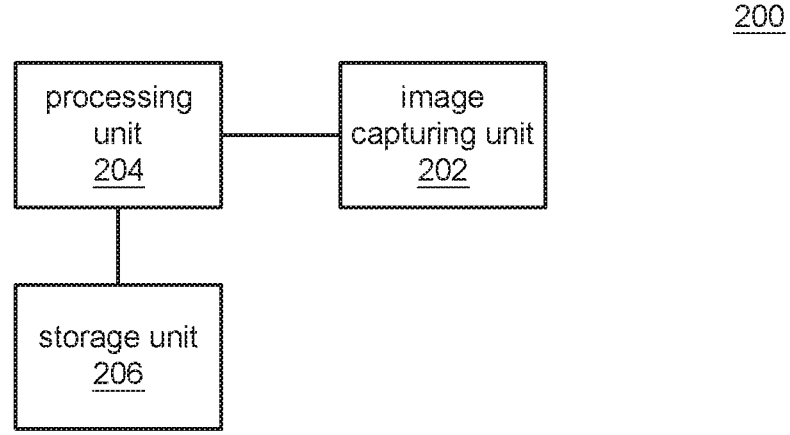
FIG. 2 shows a block diagram of an unmanned aerial vehicle according to an embodiment of the invention.

Referring to FIG. 1 and FIG. 2. FIG. 1 shows a flowchart of a method for providing obstacle avoidance using depth information of image according to an embodiment of the invention. FIG. 2 shows a block diagram of an unmanned aerial vehicle 200 according to an embodiment of the invention. The unmanned aerial vehicle 200 includes an image capturing unit 202, a processing unit 204 and a storage unit 206. The processing unit 204 is coupled to the image capturing unit 202 and the storage unit 206. The image capturing unit 202, which can be realized by such as a three-dimensional image sensor, shoots a scene to generate a depth image of the scene. The processing unit 204, which can be realized by such as a micro-controller or a microprocessor, receives the depth image from the image capturing unit 202 and executes an obstacle avoiding function on the unmanned aerial vehicle 200 according to the depth image. The storage unit 206 can be realized by such as a memory.

In step S102, the image capturing unit 202 shoots a scene to obtain a depth image of the scene. The image capturing unit 202 is, for example, configured at the front of the unmanned aerial vehicle 200 to capture a depth image of the scene in front of the unmanned aerial vehicle 200. In an embodiment, in order to save power, the image capturing unit 202 is activated only after the unmanned aerial vehicle 200 enters the automatic flight mode.

Figure 3:
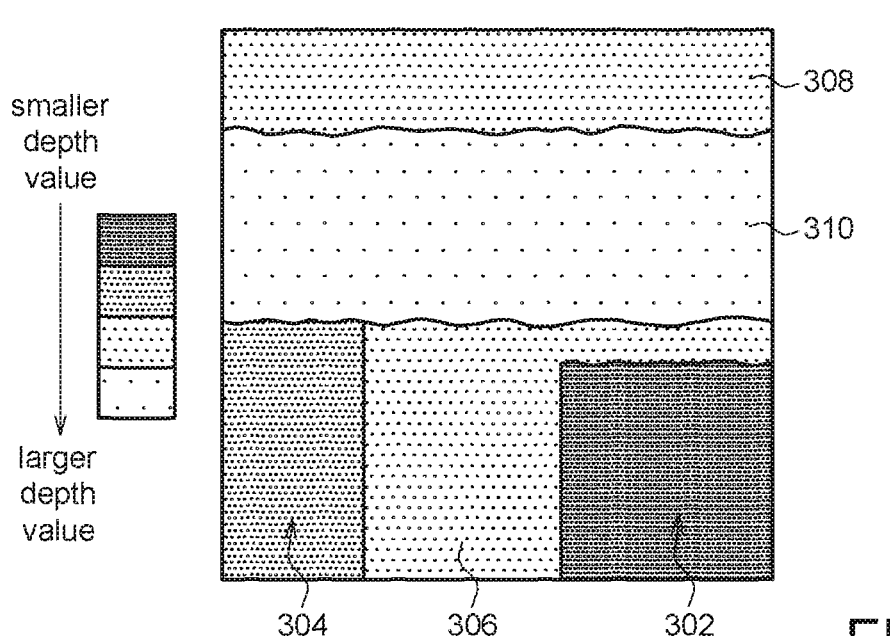
FIG. 3 shows a schematic diagram of a depth image captured by an image capturing unit according to an embodiment of the invention.

Referring to FIG. 3, a schematic diagram of a depth image 300 captured by the image capturing unit 202 according to an embodiment of the invention is shown. The depth image 300 is the depth image of the scene in front of the unmanned aerial vehicle 200. The depth image 300 includes a plurality of pixels each having a depth value between 0-255. In the depth image 300, the blocks composed of pixels arranged according to an ascending order of depth values (that is, the colors of the pixels are arranged from dark colors to light colors), can be represented as block 302, block 304, block 306 (or block 308) and block 310 in order. The blocks 306 and 308 have the same depth value. For convenience of description, the depth image 300 exemplarily has four depth values in the present embodiment.

In the present invention, the larger the depth value is (that is, the lighter the pixel color is), the farther the unmanned aerial vehicle 200 is away from the obstacle; the smaller the depth value is (that is, the darker the pixel color is), the closer the unmanned aerial vehicle 200 is to the obstacle.

However, actual application depends on the settings of the image capturing unit 202, and is not limited to above exemplification. For example, some image capturing units may be set in a manner that the image closer to the obstacle has a larger depth value (that is, the lighter the pixel color), and the image farther away from the obstacle has a smaller depth value (that is, the darker the pixel color). In short, any settings of the image capturing unit 202 will do as long as the processing unit 204 understands the information of the settings. Since different image capturing units have different sensing ranges, some image capturing units cannot recognize depth information of an obstacle which is too far or too close in the scene. Those depth values of the pixels corresponding to the unrecognizable object will be set as the minimum value 0 or the maximum value 255.

In step S104, the processing unit 204 receives the depth image 300 captured by the image capturing unit 202, and determines a flight direction and a flight distance of the unmanned aerial vehicle 200 according to the depth image 300. Furthermore, the processing unit 204 determines which block of the depth image 300 does not have obstacles or has fewer obstacles according to the depth value of each pixel in the depth image 300, and then controls the unmanned aerial vehicle 200 to fly according to the position of the block. Then, the processing unit 204 determines the flight distance of the unmanned aerial vehicle 200 according to the depth values of all pixels in the block. Detailed descriptions are disclosed below.

Figure 4:
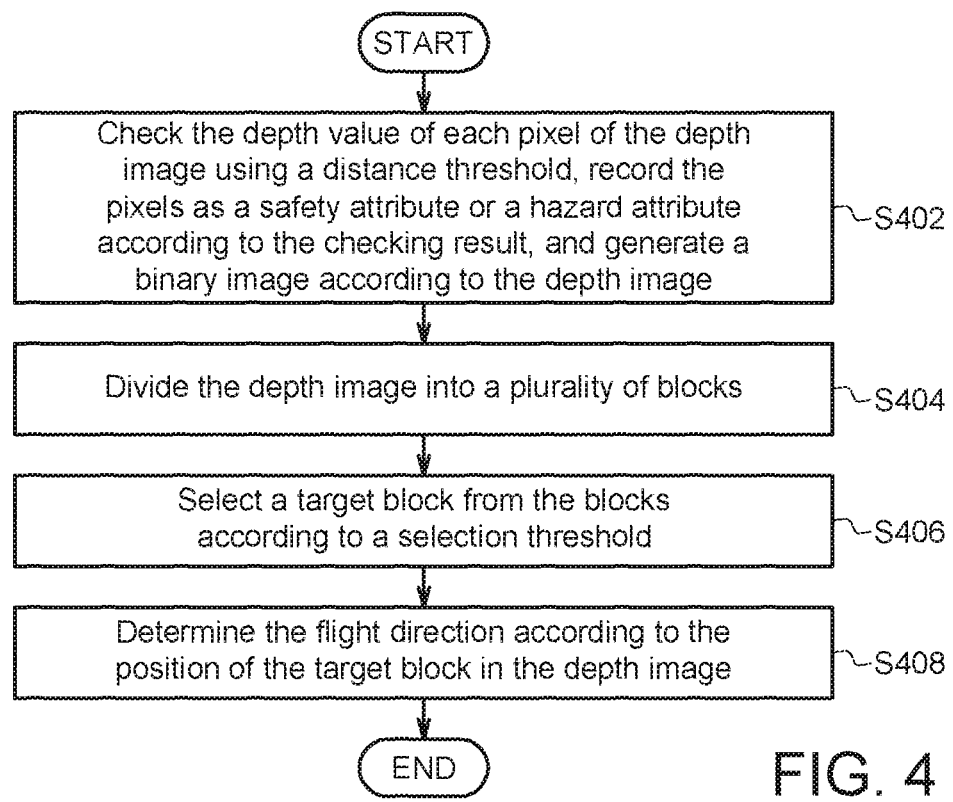
FIG. 4 shows a flowchart of determining a flight direction according to a depth image.

Referring to FIG. 4, a flowchart of determining a flight direction according to the depth image 300 is shown. In step S402, the processing unit 204 performs image processing to the depth image 300. That is, the processing unit 204 checks the depth value of each pixel in the depth image 300 using a distance threshold, and records each pixel as a pixel with safety attribute or a pixel with hazard attribute in the storage unit 206 according to the checking result.

Let the binarization method be taken for example. A binary image is generated according to a depth image. If the depth values of the pixels are set as the maximum depth value (depth value 255 normally corresponds to white color), this indicates that the pixels have safety attribute. If the depth values of the pixels are set as the minimum depth value (depth value 0 normally corresponds to black color), this indicates that the pixels have hazard attribute. Normally, the depth image is represented by gray levels, and the depth value of each pixel in the depth image corresponds to a gray level value (gray scale). The binary representation will show two types of color blocks, such as black block and white block in the image. Specifically, during the binarization process, the processing unit 204 will convert the depth value of each pixel of the depth image into a length (that is, the distance to the object), and further determines whether the distance is smaller than the distance threshold. If the distance is larger than or equivalent to the distance threshold, then the processing unit 204 sets the depth value of the pixel at a relative position as 255 according to the binarization result. If the distance is smaller than the distance threshold, the processing unit 204 sets the depth value of the pixel at a relative position as 0 according to the binarization result. Lastly, the binary image related to the depth image is formed and stored in the storage unit 206.

The distance threshold represents a safety distance. If the length is smaller than the safety distance, this indicates that the obstacle is so close to the unmanned aerial vehicle 200. Under such a circumstance, since the unmanned aerial vehicle 200 only has a shorter response time, the unmanned aerial vehicle 200 will have a larger probability of colliding with the obstacle. In an embodiment, during the generation of the depth image 300, the image capturing unit 202 automatically regards all unrecognizable objects as being far away from the unmanned aerial vehicle 200 (the depth value of the pixel is represented by 255). To avoid such a situation jeopardizing flight safety, during the process of binarizing the depth image 300, the processing unit 204 will set the depth values (i.e. the depth value of the pixel is the maximum value 255) corresponding to unrecognizable objects as the minimum depth value to assure the flight safety of the unmanned aerial vehicle 200.

The distance threshold is an adjustable parameter related to the sensing range of the image capturing unit 202, and is also related to the flight speed of the unmanned aerial vehicle 200. For example, if the unmanned aerial vehicle 200 has a faster flight speed, then the distance threshold can be increased, such that the unmanned aerial vehicle 200 can have more response time to avoid obstacles.

Figure 5:
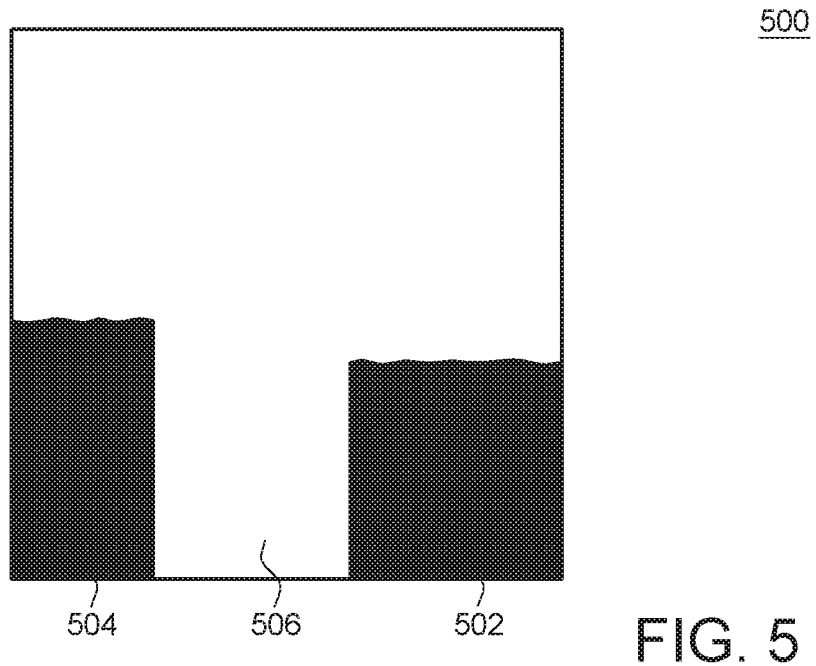
FIG. 5 shows a schematic diagram of a binary image generated through the binarization of a depth image.

Referring to FIGS. 3 and 5, FIG. 5 shows a schematic diagram of a binary image 500 generated through the binarization of the depth image 300. The binary image 500 is another image generated from the depth image 300. In the depth image 300, the lengths corresponding to the depth values of all pixels included in the blocks 306, 308 and 310 are larger than or equivalent to the distance threshold, and this indicates that all pixels included in the blocks 306, 308 and 310 have safety attribute. Therefore, the processing unit 204 sets the depth values of the binary image pixels corresponding to all pixels included in the blocks 306, 308 and 310 as the maximum depth value 255, and after the setting is completed, the binary image pixels corresponding to all pixels included in the blocks 306, 308 and 310 form the block 506 in the binary image 500. The depth values of all pixels included in the blocks 302 and 304 are smaller than the distance threshold, and this indicates that all pixels included in blocks 302 and 304 have hazard attribute. Therefore, the processing unit 204 sets the depth values of the binary image pixels corresponding to all pixels included in the blocks the blocks 302 and 304 as the minimum depth value 0, and after the setting is completed, the binary image pixels corresponding to all pixels included in the blocks 302 and 304 form blocks 502 and 504 in the binary image 500. In another embodiment, the processing unit 204 does not have to set the depth values of all the pixels with safety attribute and the depth values of all the pixels with hazard attribute as the maximum depth value 255 and the minimum depth value 0, respectively. The processing unit 204 only needs to assign two different values to form the binary image 500, in view of the depth values of all pixels in the depth image 300, to represent that each pixel has a safety attribute or a hazard attribute.

In the binary image 500, the block 506 is composed of pixels with safety attribute, and the blocks 502 and 504 are composed of pixels with hazard attribute. In other words, the block 506 indicates that the obstacles are farther away or there are no obstacles nearby, so the unmanned aerial vehicle 200 is unlikely to collide with any obstacles if the unmanned aerial vehicle 200 flies toward the direction corresponding to the block 506. Contrarily, the blocks 502 and 504 indicate that there are obstacles nearby, and the probability of the unmanned aerial vehicle 200 being unable to fly toward the directions corresponding to the blocks 502 and 504 increases.

Figure 6:
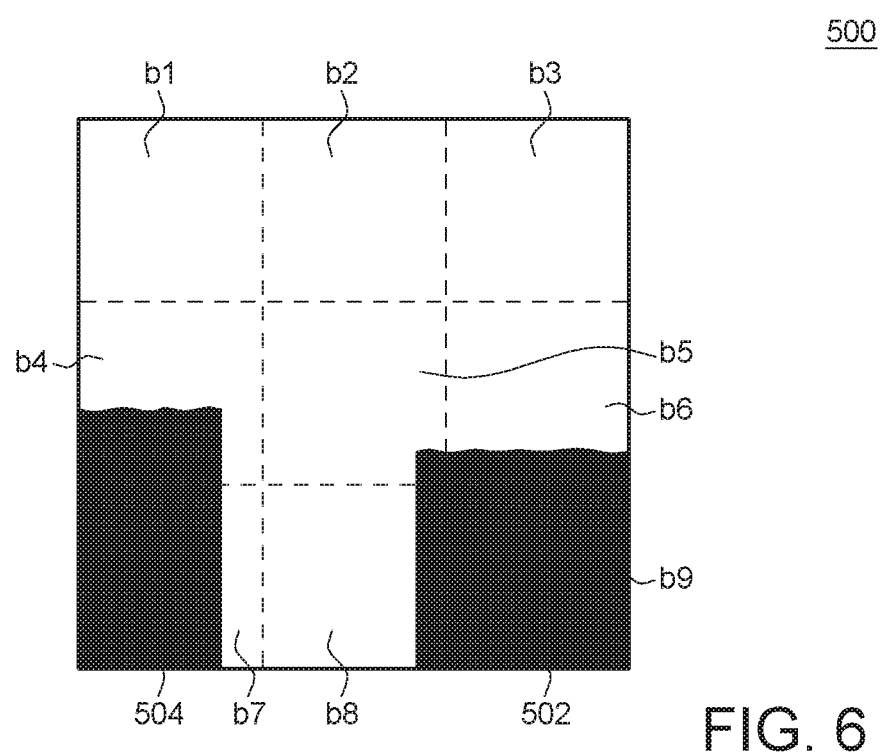
FIG. 6 shows a schematic diagram of a binary image being divided into a plurality of blocks according to an embodiment of the invention.

In step S404, the processing unit 204 divides the binary image 500 into a plurality of blocks. Referring to FIG. 6, a schematic diagram of a binary image 500 being divided into a plurality of blocks according to an embodiment of the invention is shown. After generating the binary image 500, the processing unit 204 divides the binary image 500 into nine blocks b1-b9 having the same size. It should be noted that the division quantity and the division size are not limited to above exemplification. In an embodiment, the size of the unmanned aerial vehicle 200 and the viewing angle of the image capturing unit 202 can be obtained by the programmer in advance. The processing unit 204 divides the image according to the size of the unmanned aerial vehicle 200 and the viewing angle of the image capturing unit 202 to assure that the actual scene corresponding to a block at least allows the unmanned aerial vehicle 200 to pass through. If the division size of the image is improper, it may happen that the unmanned aerial vehicle 200 cannot smoothly pass through the actual scene corresponding to the block even though the judgment indicates that the block corresponds to a safe direction.

In step S406, the processing unit 204 selects a target block from the blocks according to a selection threshold. Furthermore, the processing unit 204 checks whether the respective ratio of the pixels with hazard attribute in each of the blocks b1-b9 exceeds the selection threshold, and selects the target block according to the checking result.

For example, the ratios of the pixels with hazard attribute in the blocks b1-b9 are 0%, 0%, 0%, 40%, 4%, 20%, 80%, 20% and 100%, respectively.

Then, the processing unit 204 selects the block whose ratio is smaller than the selection threshold as the target block. Suppose the selection threshold is 5%. Then, the processing unit 204 selects the blocks b1, b2, b3 and b5 as target blocks. Since the selection is based on the ratio of the pixels with hazard attribute in a selected block, the selection threshold is an unsafety index. If the ratio of the pixels with hazard attribute in the selected block is larger than the selection threshold, this indicates that there are more obstacles existing in the selected block, and this block is unsafe for the unmanned aerial vehicle 200.

In an embodiment, if the quantity of target blocks is plural, then the processing unit 204 can select one of the target blocks as the target block according to a predetermined sequence such as blocks b1-b9. If the processing unit 204 selects the target block according to the predetermined sequence, then the block b1 will be selected as the target block. The predetermined sequence can be arbitrarily set by the user.

In another embodiment, if the quantity of target blocks is plural, the processing unit 204 can select one of the target blocks as the target block according to a priority. After the processing unit 204 divides the binary image 500 into a plurality of blocks, the processing unit 204 can assign different priority values to the blocks according to the positions of the blocks in the binary image 500 respectively. For example, the block at the central position (that is, the block b5) has the highest priority, and then the priority from high to low are respectively assigned to the block above the central block (that is, the block b2), the block under the central block (that is, the block b8), the block to the left of the central block (that is, the block b4) and the block to the right of the central block (that is, the block b6), and subsequently, the corner blocks (that is, block b1, b3, b7 and b9). If the quantity of target blocks is plural, then the processing unit 204 selects the block having higher priority as final target block. In the present embodiment, if the blocks b1, b2, b3 and b5 are selected as target blocks, the processing unit 204 selects the block b5 as the final target block.

In step S408, the processing unit 204 determines the flight direction according to the position of the target block. Suppose the target block is the block b5 which is at the central position of the binary image 500, then the unmanned aerial vehicle 200 can take the right ahead as the flight direction. Suppose the target block is the block b1, which is at the top left of the binary image 500, then the unmanned aerial vehicle 200 can take the top left as the flight direction. Similarly, the flight directions for remaining blocks can be obtained by the same analogy, and are not repeated here.

In an embodiment, the processing unit 204 can prioritize the blocks respectively according to the shortest flight path. For example, the highest priority is assigned to the central block. If the central block has the highest priority and is selected as the target block, then the unmanned aerial vehicle 200 can take the direct front as the flight direction. Since the unmanned aerial vehicle 200 does not need to veer, power consumption can be saved.

In an embodiment as indicated in step S406, if the processing unit 204 cannot determine the flight direction of the unmanned aerial vehicle 200 according to the depth image (such as being so close to the object or unable to obtain correct depth image), then the processing unit 204 changes the flight direction of the unmanned aerial vehicle 200 for the image capturing unit 202 to shoot another scene to obtain a depth image of the another scene. For example, the processing unit 204 can control the unmanned aerial vehicle 200 to change the flight direction through such as leftward steering or rightward steering, or control the unmanned aerial vehicle 200 to translate to another direction through such as leftward translation, rightward translation, upward translation or downward translation.

In another embodiment, apart from the image capturing unit 202 configured at the front of the unmanned aerial vehicle 200, the unmanned aerial vehicle 200 further includes a plurality of image capturing units respectively configured at the left, the right and the rear of the unmanned aerial vehicle 200. If the processing unit 204 cannot determine the flight direction of the unmanned aerial vehicle 200 according to the depth image, the processing unit 204 controls one of other image capturing units to capture a depth image of another scene, and then determines the flight direction according to the depth image of the another scene.

Figure 7:
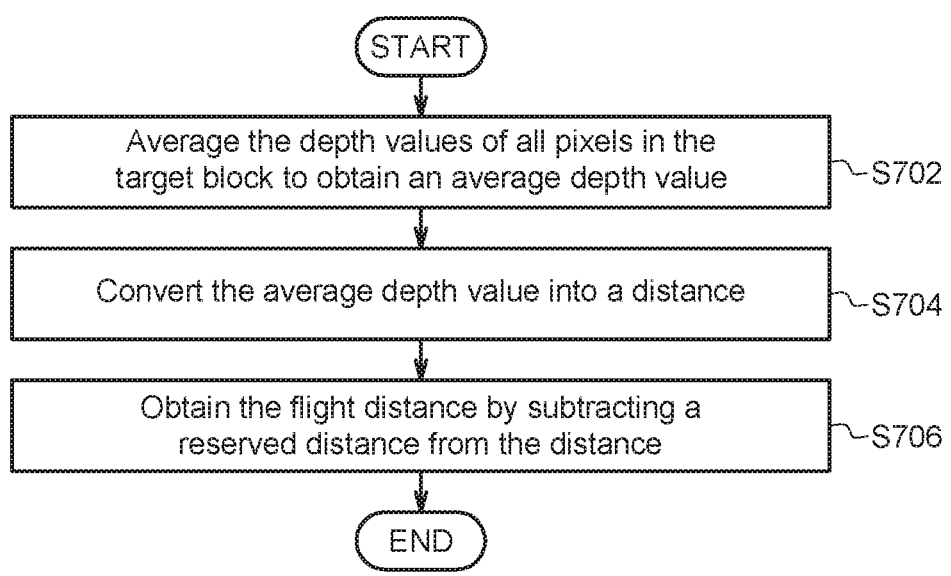
FIG. 7 shows a flowchart of determining a flight distance according to a depth image.

Referring to FIGS. 6 and 7, FIG. 7 shows a flowchart of determining a flight distance according to the depth image. In step S702, the processing unit 204 averages the depth values of all pixels in the target block to obtain an average depth value. For example, if the target block is block b5, then the processing unit 204 sums up the depth values of all pixels in the block b5, and then divides the sum by the quantity of pixels in the block b5 to obtain the average depth value.

In step S704, the processing unit 204 converts the average depth value into a distance. To put it in greater details, the processing unit 204 converts the average depth value into the distance according to a conversion formula. The conversion formula, which corresponds to actual length, can be obtained from experimental data and stored in the storage unit 206. The average depth value represents an approximate distance between the unmanned aerial vehicle 200 and the obstacles in the scene corresponding to the target block. Suppose the processing unit 204 calculates the distance as 2 meters. This indicates that the distance between the unmanned aerial vehicle 200 and the obstacles in the scene corresponding to the target block is about 2 meters.

In step S706, the processing unit 204 subtracts the distance by a reserved distance to obtain a flight distance. Suppose the reserved distance is 1.85 meters. The processing unit 204 subtracts the distance of 2 meters by the reserved distance of 1.85 meters to obtain the flight distance of 0.15 meters. The reserved distance prevents the unmanned aerial vehicle 200 flying toward a direction corresponding to the target block from being so close to obstacles to avoid the unmanned aerial vehicle 200 colliding with the obstacles. In general, the reserved distance is larger than the distance threshold.

Referring to FIG. 1. After the processing unit 204 determines the flight direction and the flight distance according to the binary image and the depth image, the method proceeds to step S106, and the processing unit 204 controls the unmanned aerial vehicle 200 to fly according to the flight direction and the flight distance. For example, if the flight direction heads toward the direct front and the flight distance is 0.15 meters, then the processing unit 204 controls the unmanned aerial vehicle 200 to fly for 0.15 meters toward the direct front.

In another embodiment, the methods disclosed in FIGS. 1, 4 and 7 can also be used in the automatic return mode of the unmanned aerial vehicle 200. For example, in the return flight, the image capturing unit 202 is turned on to capture the depth image of the scene. When an obstacle is detected, the processing unit 204 executes the methods disclosed in FIGS. 1, 4 and 7. After the unmanned aerial vehicle 200 avoids the obstacle, the processing unit 204 controls the unmanned aerial vehicle 200 to enter the automatic return mode again.

In the above embodiments, the obstacle avoiding method can directly adopt the depth information of image for the unmanned aerial vehicle 200 to fly to the destination. Apart from executing the methods disclosed in FIGS. 1, 4 and 7, the processing unit 204 can dynamically adjust the priority sequence of the flight block according to the direction of the predetermined destination to determine the flight direction and the flight distance, such that the unmanned aerial vehicle 200 can successfully avoid obstacles and achieve automatic obstacle avoidance in the return flight.

In the method for providing obstacle avoidance using depth information of image disclosed in above embodiments of the invention, the flight direction and the flight distance of the unmanned aerial vehicle are determined according to the depth image to avoid obstacles. Since the depth image used in obstacle avoidance is a 2-dimensional image, the volume of data computation required in the present invention is much lower than that required in an obstacle avoiding method using 3D image or 3D model. Since the method of the invention can determine and avoid obstacles using depth image without having to create an environment model, extra time can be saved.

It will be apparent to those skilled in the art that various modifications and variations can be made to the disclosed embodiments. It is intended that the specification and examples be considered as exemplary only, with true scope of the disclosure being indicated by the following claims and their equivalents.

What is claimed is:

1. A method for providing obstacle avoidance using depth information of image, comprising:
    shooting a scene, by a three-dimensional image sensor, to obtain a depth image of the scene;
    determining a flight direction and a trip distance according to the depth image to decide which direction to fly in the next moment and how far to fly toward the flight direction; and
    flying for the trip distance toward the flight direction.

2. The method according to claim 1, wherein the step of determining the flight direction according to the depth image comprises:
    checking the depth value of each pixel of the depth image using a distance threshold, recording the pixels as a safety attribute or a hazard attribute according to the checking result, and generating a binary image according to the depth image;
    dividing the binary image into a plurality of blocks;
    selecting a target block from the blocks according to a selection threshold; and
    determining the flight direction according to the position of the target block in the binary image.

3. The method according to claim 2, wherein the distance threshold is related to the sensing range of the three-dimensional image sensor.

4. The method according to claim 2, wherein the step of checking the depth value of each pixel of the depth image using the distance threshold comprises:
    converting the depth value of the each pixel into a length;
    determining whether the length is smaller than the distance threshold;
    wherein when the length is smaller than the distance threshold, the depth value is set as a minimum depth value to represent the hazard attribute; when the length is larger than or equivalent to the distance threshold, the depth value is set as a maximum depth value to represent the safety attribute; and generating the binary image according to the previous determination.

5. The method according to claim 2, wherein the step of selecting the target block according to the selection threshold comprises:
    calculating a ratio of the pixels with the hazard attribute in the blocks respectively; and
    selecting the block whose ratio is smaller than the selection threshold as the target block.

6. The method according to claim 2, wherein the step of determining the trip distance according to the depth image comprises:
    averaging the depth value of all pixels of the target block to obtain an average depth value;
    converting the average depth value into a distance; and
    obtaining the trip distance by subtracting a reserved distance from the distance.

7. The method according to claim 6, wherein the reserved distance is larger than the distance threshold.

8. The method according to claim 2, wherein following the step of dividing the depth image into the blocks, the method further comprises:
    assigning different priority values to the blocks respectively;
    wherein when the number of selected target block is plural, then one of the target blocks is selected according to the priority values.

9. The method according to claim 8, wherein the different priority values are determined according to the positions of the blocks in the binary image.

10. The method according to claim 1, wherein in the step of determining the flight direction and the trip distance according to the depth image, the shooting direction is changed when the flight direction cannot be determined according to the depth image.

11. An unmanned aerial vehicle (UAV), comprising:
    a three-dimensional image sensor for shooting a scene to obtain a depth image of the scene;
    a processing unit coupled to the three-dimensional image sensor, the processing unit for determining a flight direction and a trip distance according to the depth image to decide which direction to fly in the next moment and how far to fly toward the flight direction, and controlling the unmanned aerial vehicle to fly for the trip distance toward the flight direction.

12. The unmanned aerial vehicle according to claim 11, wherein the unmanned aerial vehicle further comprises a storage unit, the processing unit checks the depth value of each pixel of the depth image using a distance threshold, records the pixels as a safety attribute or a hazard attribute in the storage unit according to the checking result, and generates a binary image according to the depth image; the processing unit divides the binary image into a plurality of blocks, selects a target block from the blocks according to a selection threshold, and determines the flight direction according to the position of the target block in the binary image.

13. The unmanned aerial vehicle according to claim 12, wherein the distance threshold is related to the sensing range of the three-dimensional image sensor.

14. The unmanned aerial vehicle according to claim 12, wherein the processing unit converts the depth value of the each pixel into a length and determines whether the length is smaller than the distance threshold;
wherein when the length is smaller than the distance threshold, the depth value is set as a minimum depth value to represent the hazard attribute; when the length is larger than or equivalent to the distance threshold, the depth value is set as a maximum depth value to represent the safety attribute; and generating the binary image according to the previous determination.

15. The unmanned aerial vehicle according to claim 12, wherein the processing unit calculates a ratio of the pixels with the hazard attribute in the blocks respectively, and selects the block whose ratio is smaller than the selection threshold as the target block.

16. The unmanned aerial vehicle according to claim 12, wherein the processing unit averages the depth value of all pixels of the target block to obtain an average depth value, converts the average depth value into a distance, and subtracts a reserved distance from the distance to obtain the trip distance.

17. The unmanned aerial vehicle according to claim 16, wherein the reserved distance is larger than the distance threshold.

18. The unmanned aerial vehicle according to claim 12, wherein the processing unit assigns different priority values to the blocks respectively;
wherein when the number of selected target block is plural, then one of the target blocks is selected according to the priority values.

19. The unmanned aerial vehicle according to claim 18, wherein the different priority values are determined according to the positions of the blocks in the binary image.

20. The unmanned aerial vehicle according to claim 11, wherein when the flight direction cannot be determined according to the depth image, the processing unit changes the direction of the unmanned aerial vehicle such that the three-dimensional image sensor shoots another scene to obtain the depth image of the another scene.

* * * * *